United States Patent [19]
Sutton et al.

[11] Patent Number: 5,186,588
[45] Date of Patent: Feb. 16, 1993

[54] LADDER RACK LADDER LATCH

[76] Inventors: Charles W. Sutton; J. Wayne Sutton, both of 5505 NW. 64th, Oklahoma City, Okla. 73132

[21] Appl. No.: 695,063

[22] Filed: May 3, 1991

[51] Int. Cl.⁵ .............................................. E05B 73/00
[52] U.S. Cl. ................................... 410/120; 224/315; 248/503; 182/127
[58] Field of Search ................ 182/127; 248/304, 339, 248/340, 341, 503; 211/13; 280/769; 410/96, 97, 98, 99, 100, 120; 224/324, 315

[56] References Cited

U.S. PATENT DOCUMENTS

| | | | |
|---|---|---|---|
| 2,134,823 | 11/1938 | Herrmann et al. | 248/503 X |
| 2,588,870 | 3/1952 | Pittman | 248/503 X |
| 2,615,667 | 10/1952 | Smith | 248/361 |
| 3,672,612 | 6/1972 | Laing, Jr. | 182/127 X |
| 3,877,624 | 4/1975 | Carson | 248/503 X |
| 3,888,398 | 6/1975 | Payne | 248/503 X |
| 3,904,094 | 9/1975 | Correll | 248/503 X |
| 4,170,331 | 10/1979 | Faulstich | 224/324 |
| 4,262,834 | 4/1981 | Nutt | 182/127 X |
| 4,813,585 | 3/1989 | Nutt | 182/127 X |
| 4,827,742 | 5/1989 | McDonald | 182/127 X |

Primary Examiner—Michael S. Huppert
Assistant Examiner—James T. Eller, Jr.
Attorney, Agent, or Firm—Robert K. Rhea

[57] ABSTRACT

A latch for securing a ladder to a ladder rack mounted on a vehicle having a cross brace is formed by a latch body rigidly secured in depending relation to the cross brace. A sleeve pivotally mounted in the ladder latch body slidably receives the rod shaft portion of a J-shaped hook gripping a rung of the ladder when in a first position and releasing the ladder rung when pivoted to a second position. A lever and handle, pivotally supported by the latch body is pivotally connected with the rod shaft of the hook for manually positioning the hook in its first and second positions. The latch body receives the shackle of a lock for preventing unauthorized manual movement of the handle and releasing the rung of a ladder mounted on the rack.

5 Claims, 1 Drawing Sheet

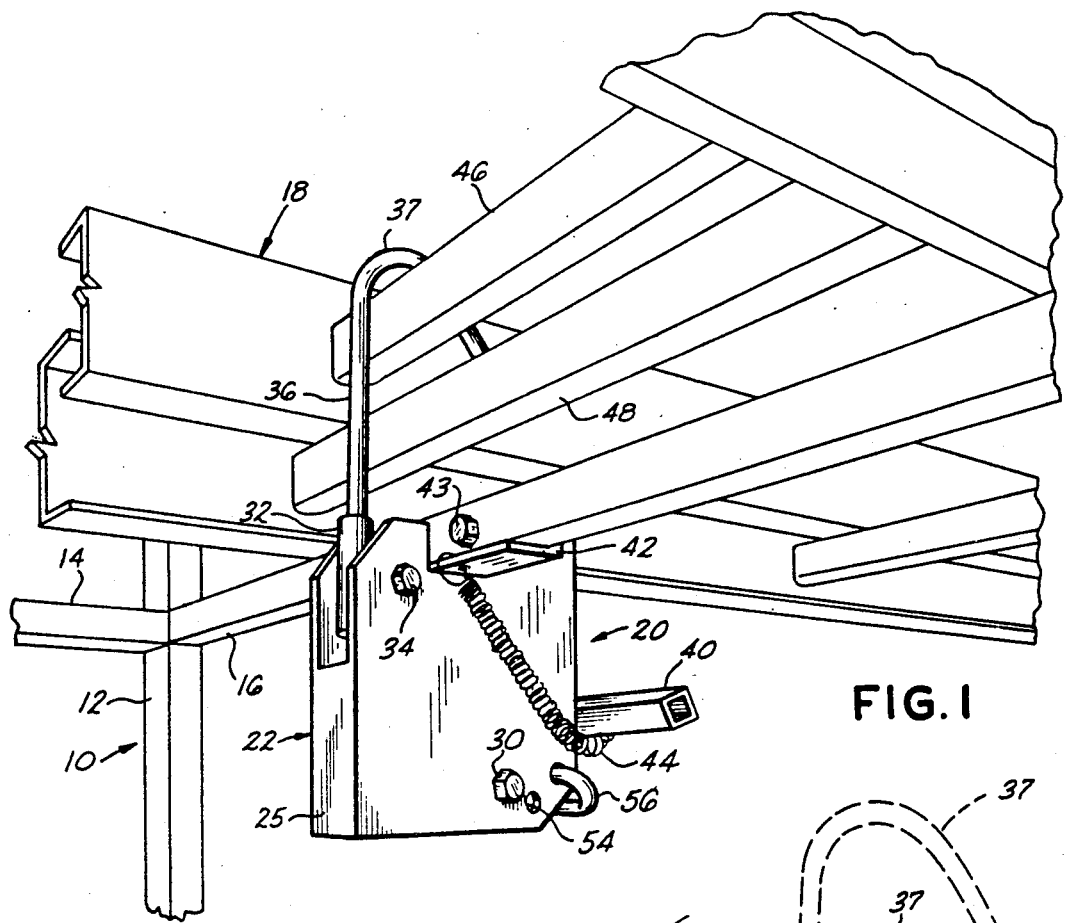
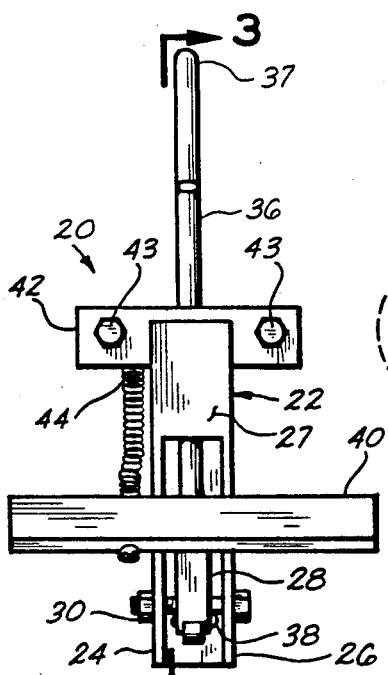
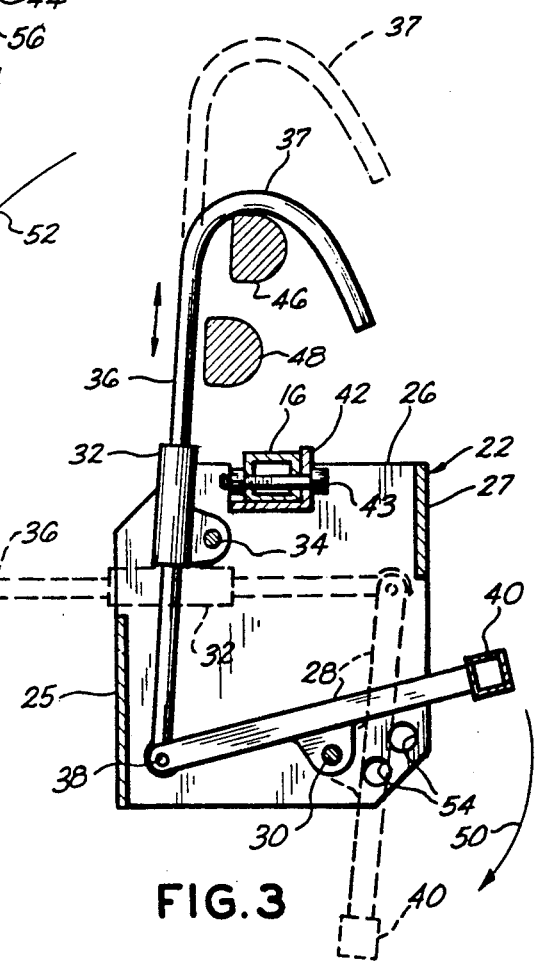
FIG. 1
FIG. 2
FIG. 3

LADDER RACK LADDER LATCH

BACKGROUND OF THE INVENTION

1. Field of the Invention

This invention relates to ladder racks and more particularly to a clamp or latch for securing a ladder on a ladder rack.

It is common for service personnel to transport ladders on ladder racks mounted on the top of pickup trucks or the like.

It is necessary that the ladder be secured to the ladder rack to hold the ladder in place while the vehicle is moving.

It is also desirable that this latch, or means of securing the ladder to the rack, lock the ladder to the rack to prevent unauthorized removal of the ladder.

This invention provides such a device.

2. Description of the Prior Art

The prior art discloses a number of ladder racks for vehicles, some of which provide clamping members for securing the ladder in place while being transported. For example, U.S. Pat. No. 2,615,667 discloses a ladder clamp extending transversely of a vehicle which supports an intermediate portion of an extension ladder when placed thereon. The clamp portion of this patent discloses toggle linkage moving opposing inverted L-shaped bracket members toward and away from the upper limit of the extension ladder side rails in a clamp and release action of the bracket members when a lever is manually moved in respective directions.

U.S. Pat. No. 4,170,331 discloses a vehicle ladder rack for mounting and transporting extension ladders thereon which features a transverse cross member angularly rotated manually in opposing directions by a handle at one side of the rack to bias a spring arm into and out of gripping engagement with one rung of the ladder.

This invention is distinctive over these and other similar patents by providing a housing secured to a cross brace of a vehicle ladder rack which supports an elongated inverted J-shape hook pivoted angularly and vertically toward and away from rungs of a ladder by manually operated linkage pivotally mounted in the housing and connected with the J-shaped hook.

SUMMARY OF THE INVENTION

A rectangular upright housing formed by spaced apart parallel opposing side members transversely supports a mounting member at its upper limit for connecting the housing to a transverse cross member of a vehicle ladder rack.

An elongated ladder rung hook is pivotally and vertically slidably supported by the housing. A handle operated lever within the housing moves the hook into and out of engagement with ladder rungs.

A padlock, supported by the housing, prevents unauthorized release of the latch.

The principal objects of this invention are to provide a latch for securing a ladder to a ladder rack for transport of the ladder; prevent unauthorized removal of the ladder from the rack; and, in which the latch is easily operated by a workman standing on the surface of the earth adjacent the ladder rack.

BRIEF DESCRIPTION OF THE DRAWINGS

FIG. 1 is a fragmentary perspective view of the ladder latch secured to a fragment of a ladder rack and lockingly engaging rungs of a ladder supported by the ladder rack;

FIG. 2 is a rear end elevational view of the ladder latch, per se; and,

FIG. 3 is a vertical cross sectional view, taken substantially along the line 3—3 of FIG. 2, and illustrating by broken lines, the ladder released positions of the latch.

DESCRIPTION OF THE PREFERRED EMBODIMENTS

Like characters of reference designate like parts in those figures of the drawings in which they occur.

In the drawings:

The reference numeral 10 indicates the rearward fragmentary portion of a pickup truck ladder rack formed by upright standards 12 supporting parallel side rails 14, only one of each being shown, interconnected by a rearward cross brace 16.

A collapsed two-section conventional extension ladder 18 is supported at its rearward end portion by the rearward cross member 16.

The numeral 20 indicates the latch as a whole secured to and depending from the cross brace 16 in the manner presently explained. The latch 20 comprises a generally hollow body 22 having metallic plate side walls 24 and 26 joined in spaced-apart parallel relation by forward and rearward end walls 25 and 27, respectively. An actuator arm or lever 28 is pivotally supported between the lower rearward portion of the side walls by a transverse pin or bolt 30 for vertical pivoting movement of the lever end portions about the horizontal axis of the bolt 30.

A sleeve 32 is pivotally mounted on a transverse bolt or pin 34 diagonally opposite the position of the bolt 30 for slidably receiving the rod shaft 36 of an inverted J-shape hook 37. The rod shaft is pivotally connected, as at 38, with the bifurcated inward end portion of the lever 28. The other end portion of the lever 28, projects rearwardly beyond the body 22 and is rigidly connected with a handle 40, extending transversely of the body, for manual vertical pivotal movement of the lever 28 about the axis of the bolt 30 and pivoting and sliding movement of the shaft 36 and hook 37, as presently explained.

A ladder latch mount comprises a length of angle iron 42 which extends transversely between and beyond the opposing body sides 24 and 26 within a transverse recess formed in the upper limit thereof rearwardly of the sleeve 32. The angle iron 42 nests an intermediate portion of the cross member 16 rearward and depending surfaces and is secured thereto by a pair of bolts and nuts 43.

A helical spring 44 extends between and is connected at its respective ends with the angle iron 42 and the handle 40 for normally maintaining the handle in its solid line position.

OPERATION

Prior to placing the ladder 18 on the rack 10, the handle 40 is manually forced downwardly and forwardly in the direction of the arrow 50 to its downward dotted line position which initially slidably lifts the shaft 36 in the sleeve 32 then pivots the hook 37 forwardly and downwardly in the direction of the arrow 52 and positions the pivot joint secured by the pin 38 off-center with respect to a path between the anchored end portions of the spring 44 which maintains the hook 37 in its retracted position.

The ladder 18 is positioned so that two of its superposed rungs 46 and 48 are superposed with respect to the angle iron mount 42 and cross member 16. Thereafter the handle 40 is manually lifted opposite the direction of the arrow 50 which initially slidably moves the rod shaft 36 forwardly its full limit of movement in the sleeve 32, then pivots the hook 37 upwardly and rearwardly opposite the direction of the arrow 52. The spring 44 biases the handle 40 upwardly to its solid line position and moves the inward end portion of the control lever 28 downwardly to pull the hook 37 downwardly and engage the top rung 46 and partially overlap the position of the rung 48 thus maintaining the ladder 18 on the rack.

As an added feature, the side walls 24 and 26 are transversely apertured, as at 54, below and adjacent the rearwardly projecting end portion of the lever 28 for receiving the shackle 56 of a lock and prevent unauthorized ladder removal.

Obviously the invention is susceptible to changes or alterations without defeating its practicability. Therefore, we do not wish to be confined to the preferred embodiment shown in the drawings and described herein.

We claim:

1. In a ladder latch for a ladder rack having a cross brace for supporting a ladder having rungs, the improvement comprising:
   a ladder latch body having spaced apart side walls and having body securing means thereon for securing the body to said cross brace;
   hook means pivotally supported by said body for gripping a ladder rung when in a first position and releasing the ladder rung when in a second position;
   lever means supported between said body side walls for pivoting movement about a first horizontal axis and including a handle for manually pivoting said hook means vertically about a second horizontal axis between said first and said second positions; and,
   resilient means extending between said handle and said body securing means in laterally offset relation with respect to the first horizontal axis for maintaining said hook means in said rung gripping first position and said rung released second position, respectively.

2. The ladder latch according to claim 1 in which the body securing means includes:
   a latch mount rigidly securing said body to said cross brace.

3. The ladder latch according to claim 2 in which the hook means comprises:
   a sleeve pivotally supported between said side walls for vertical pivoting movement about said second horizontal axis; and,
   an inverted J-shaped hook having an elongated hook shaft slidably received by said sleeve.

4. The ladder latch according to claim 3 in which said lever means includes:
   an elongated lever transversely connected at a first end with said handle and pivotally connected at a second end with said hook shaft.

5. In a ladder latch for a ladder rack having a cross brace for supporting a ladder having rungs, the improvement comprising:
   a ladder latch body having spaced-apart side walls and having a latch mount rigidly securing the body to said cross brace;
   a sleeve pivotally supported between said side walls for vertical pivoting movement about a first horizontal axis;
   hook means including an inverted J-shaped hook having an elongated shaft slidably received by and pivoting with said sleeve for gripping a ladder rung when in a first position and releasing the ladder rung when in a second position;
   lever means connected at a first end portion with said hook and supported between said side walls for vertical pivoting movement about a second horizontal axis and having a handle at a second end portion for manually pivoting said hook and said sleeve between said first and said second positions; and,
   biasing means extending between said handle and said latch mount in laterally offset relation with respect to the second horizontal axis for maintaining said hook means in said rung gripping first position and said rung released second position, respectively.

* * * * *